United States Patent [19]
Cheng

[11] Patent Number: 5,471,761
[45] Date of Patent: Dec. 5, 1995

[54] POWER-DRIVEN TAPE MEASURE

[76] Inventor: H. T. Cheng, P.O. Box 82-144, Taipei, Taiwan

[21] Appl. No.: 335,484

[22] Filed: Nov. 7, 1994

[51] Int. Cl.⁶ .................................................. G10B 3/10
[52] U.S. Cl. ............................ 33/761; 33/767; 33/755
[58] Field of Search ............................. 33/755, 757, 761, 33/767, 769; 242/390.8

[56] References Cited

U.S. PATENT DOCUMENTS

| 3,561,695 | 2/1971 | Wood . | |
| 4,189,107 | 2/1980 | Quenot et al. | 33/761 |
| 5,245,761 | 9/1993 | Waldherr | 33/767 X |

FOREIGN PATENT DOCUMENTS

| 92015928 | 7/1992 | Australia | 33/755 |
| 3414763 | 10/1985 | Germany | 33/769 |
| 2135969 | 9/1984 | United Kingdom | 33/755 |

Primary Examiner—Alvin Wirthlin
Attorney, Agent, or Firm—Alfred Lei

[57] ABSTRACT

A power-driven tape measure including a case having a battery chamber, a circular chamber, and an outlet communicated with the circular chamber, a motor mounted within the case, a frame enclosing the motor, an annular reel fitted within the circular chamber of the case and enclosing the frame, the annular reel having two flanges and a circular groove between the two flanges, a switch mounted on the case and electrically connected with the battery chamber of the case, the switch connected with a spring-loaded press member tending to push against the external teeth of the annular reel, a tape wound on the groove of the annular reel and having an end extending out of the outlet of the case to engage a hook, the tape being slightly larger than the groove of the annular reel in width, a driving gear fixedly mounted on the output shaft of the motor and engaged with the internal teeth of the annular reel via a gear train, and a manual gear pivotally mounted on the frame and meshed with the internal teeth of the annular reel and provided at a center with a rod extending out of the case.

1 Claim, 8 Drawing Sheets

POWER-DRIVEN TAPE MEASURE

BACKGROUND OF THE INVENTION

It has been found that all conventional power operated tape measures on the market suffer from a lot of drawbacks thereby rendering them unfit for practical use.

Figure 1:
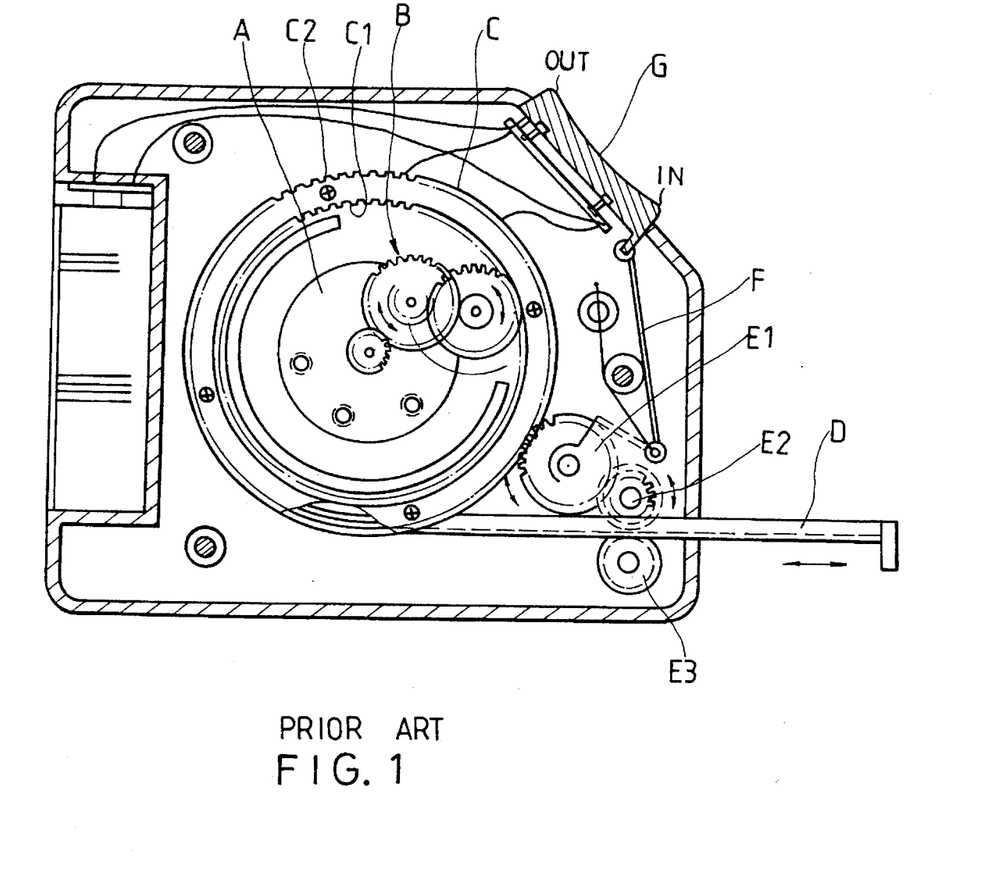
FIG. 1 is a sectional view of a first prior art power-operated tape measure.

FIG. 1 shows a first prior art power-operated tape measure. As illustrated, the power operated tape measure includes a motor A which is engaged with the internal threads C1 of a reel C via a gear train B. The external threads C2 of the reel C is meshed with a driving gear E1 which is connected with a shift rod F and engaged with a driven gear E2. A roller E3 is disposed under the driven gear so as to form a passage for a tape D. When desired to push the tape D out of the case, it is only necessary to push the button G to its OUT position. Similarly, it is only necessary to push the button G to its IN position when desired to withdraw the tape D. However, the tape D cannot be steadily pulled into the case and furthermore such a power tape measure is too complicated in structure.

Figure 2A:
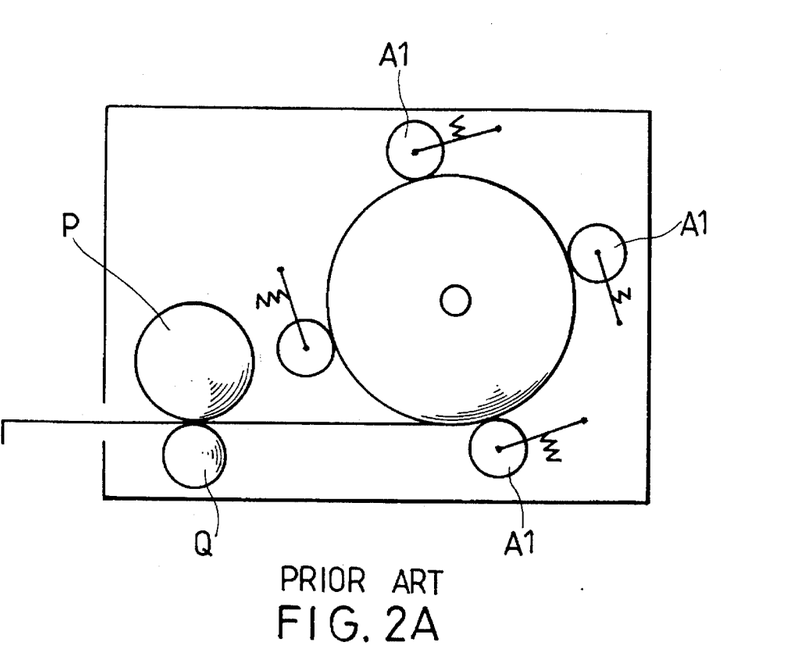
FIGS. 2A and 2B show the structure of a second prior art power-operated tape measure.
Figure 2B:
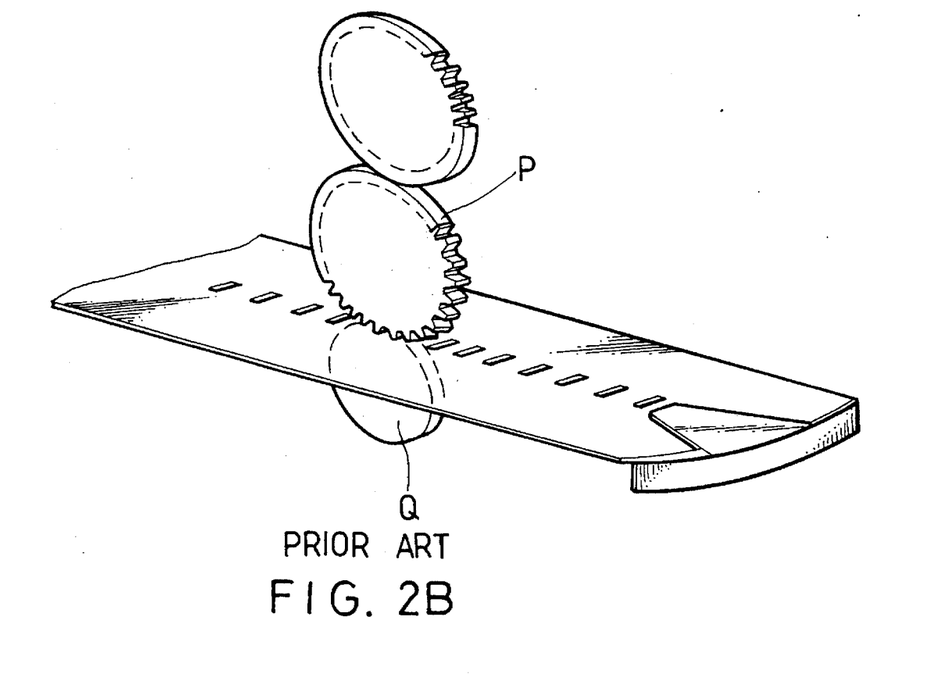

FIGS. 2A and 2B show the structure of the tape measure disclosed in U.S. Pat. No. 4,186,490. In this patent, the reel is pushed by four spring-loaded rollers A1 and the tape is formed with slots engaged between two toothed rollers P and Q. Nevertheless, the slots will weaken the strength of the tape and the two toothed gears will increase the manufacturing cost hence making it difficult to be accepted by the user.

Figure 3A:
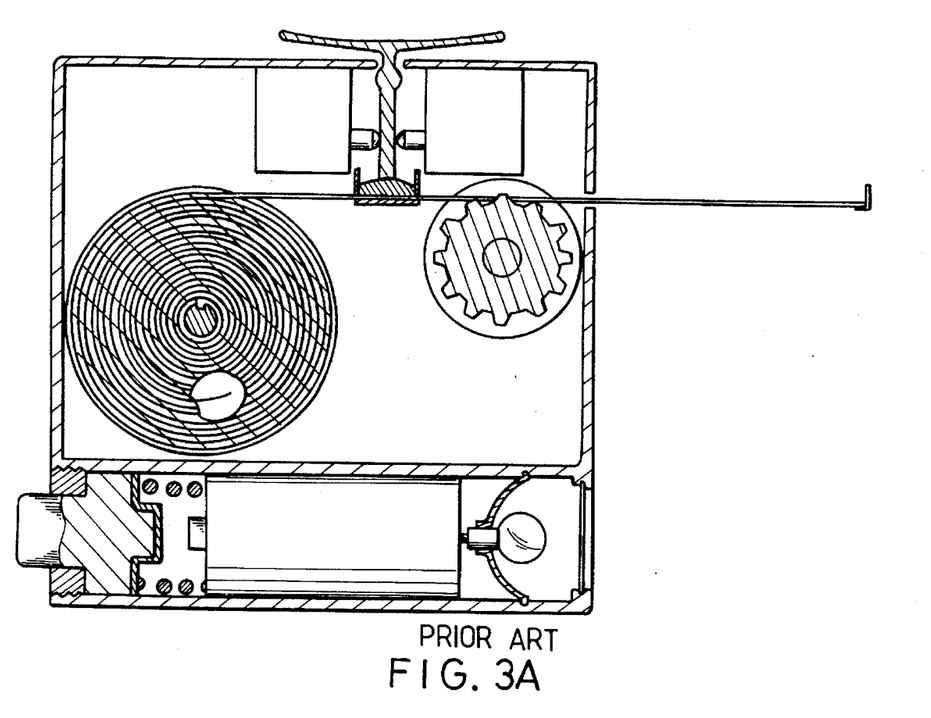
FIGS. 3A and 3B show the structure of a third prior art power-operated tape measure.
Figure 3B:
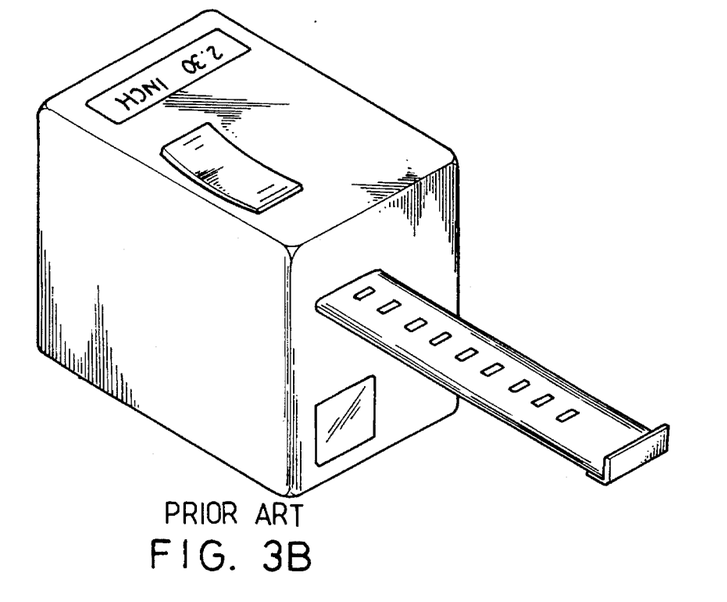
Figure 4A:
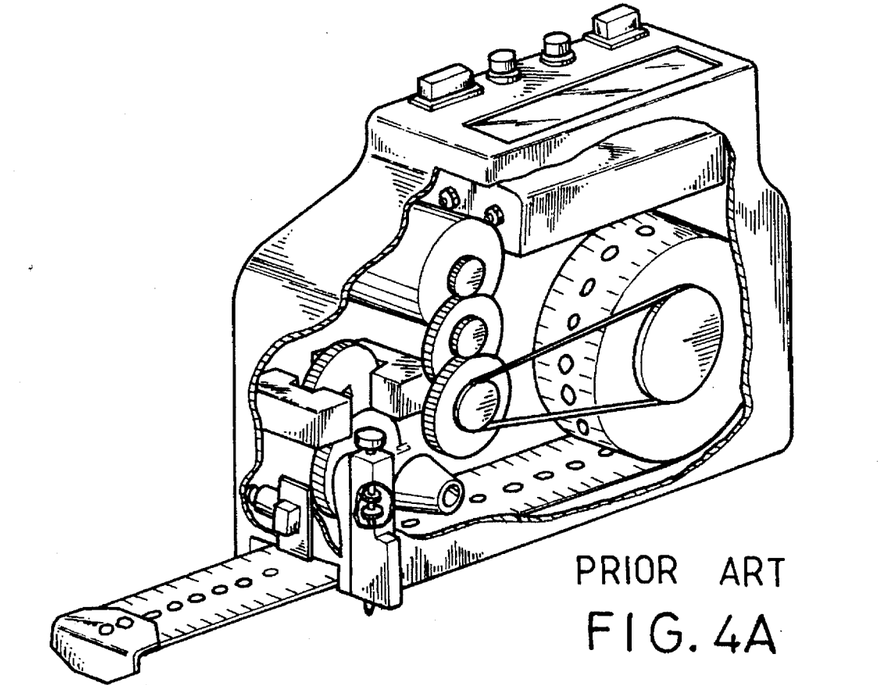
FIGS. 4A and 4B show the structure of a fourth prior art power-operated tape measure.
Figure 4B:
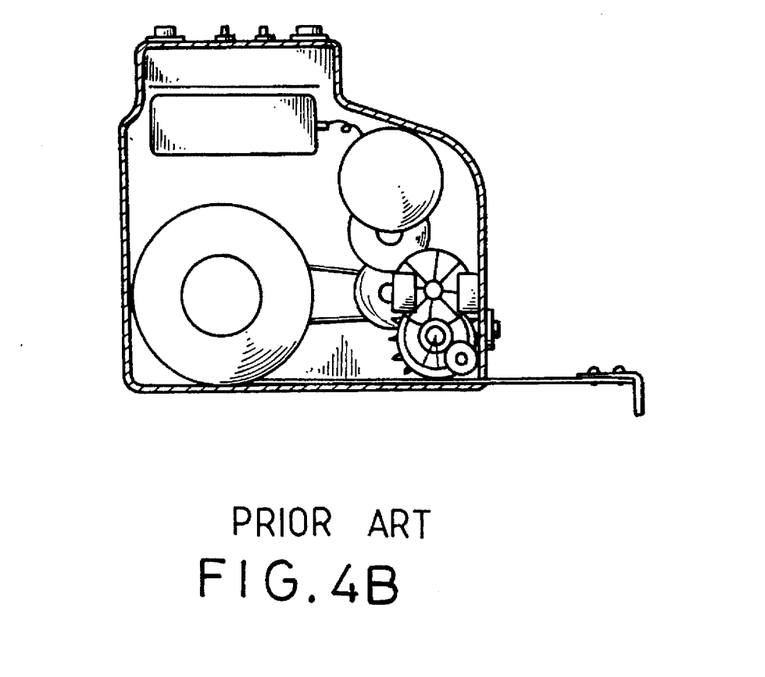
Figure 5:
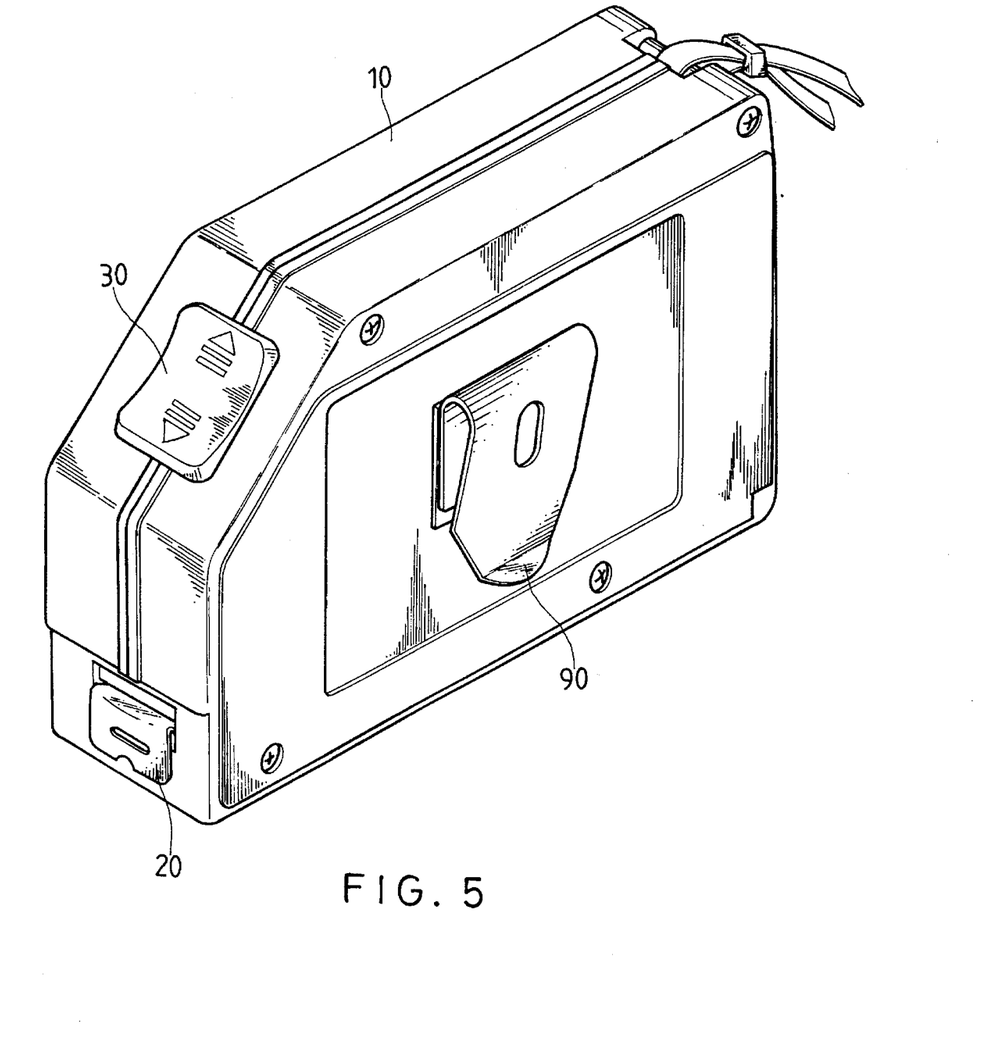
FIG. 5 is a perspective view of the present invention.
Figure 6:
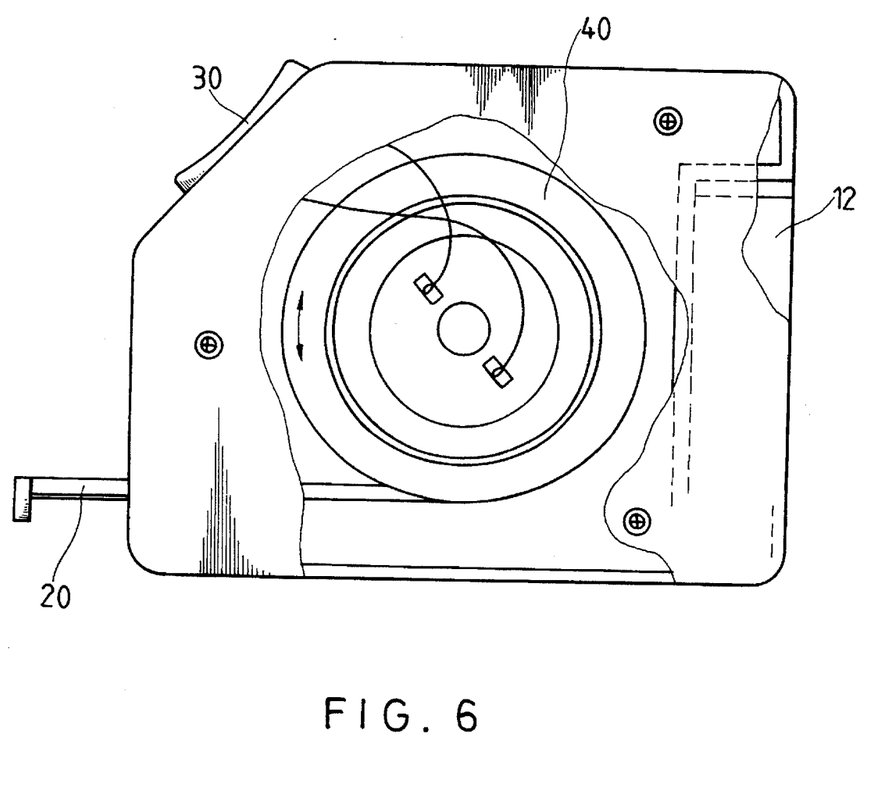
FIG. 6 is a partly broken front view of the present invention.

Similar structures of the tape measure are shown in FIGS. 3A and 3B (U.S. Pat. No. 5,044,089) and FIGS. 4A and 4B (U.S. Pat. No. 4,551,347). Nonetheless, both two patents suggest forming slots in the tape and so they still suffer from the similar drawbacks of the previous discussed prior art tape measure.

Therefore, it is an object of the present invention to provide a power-driven tape measure which can obviate and mitigate the above-mentioned drawbacks.

SUMMARY OF THE INVENTION

This invention relates to an improved power-driven tape measure.

It is the primary object of the present invention to provide a power-driven tape measure which can smoothly push out or pull in a tape as desired.

It is another object of the present invention to provide a power-driven tape measure which can prevent the tape from loosening when completely withdrawn therein.

It is still another object of the present invention to provide a power-driven tape measure which has a tape lock for keeping the tape at a desired position.

It is still another object of the present invention to provide a power-driven tape measure which is easy to operate.

It is a further object of the present invention to provide a power-driven tape measure which is practical in use.

Other objects and merits and a fuller understanding of the present invention will be obtained by those having ordinary skill in the art when the following detailed description of the preferred embodiment is read in conjunction with the accompanying drawings wherein like numerals refer to like or similar parts.

DETAILED DESCRIPTION OF THE PREFERRED EMBODIMENT

For the purpose to promoting an understanding of the principles of the invention, reference will now be made to the embodiment illustrated in the drawings. Specific language will be used to describe same. It will, nevertheless, be understood that no limitation of the scope of the invention is thereby intended, such alternations and further modifications in the illustrated device, and such further applications of the principles of the invention as illustrated herein being contemplated as would normally occur to one skilled in the art to which the invention relates.

Figure 7:
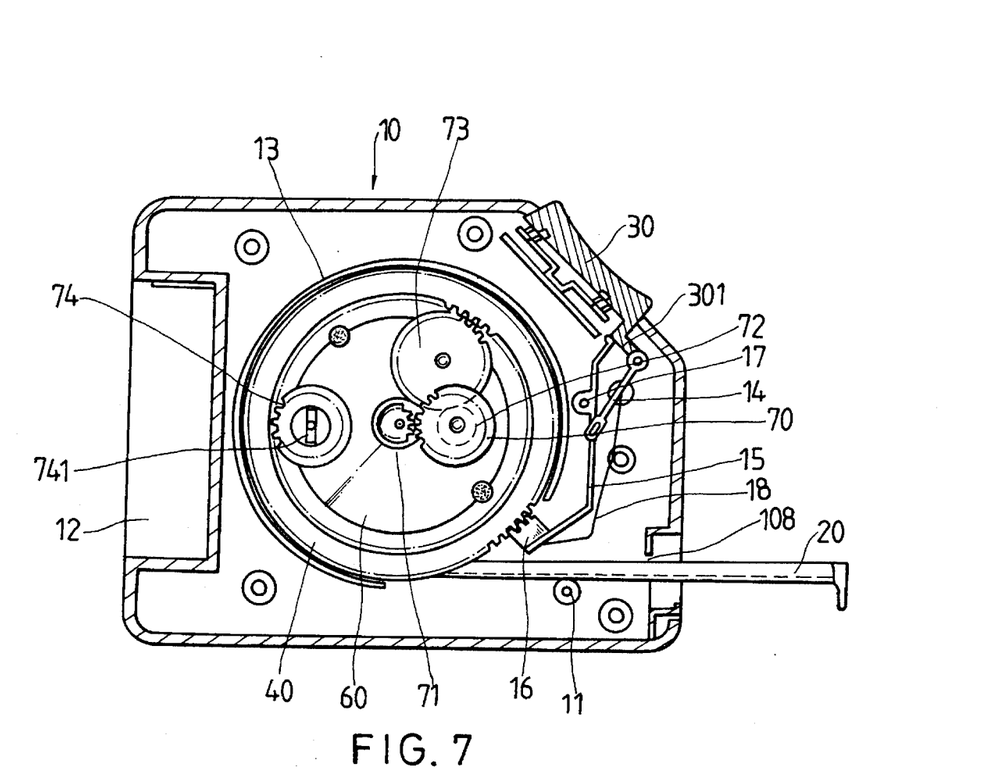
FIG. 7 shows the interior of the present invention.
Figure 8:
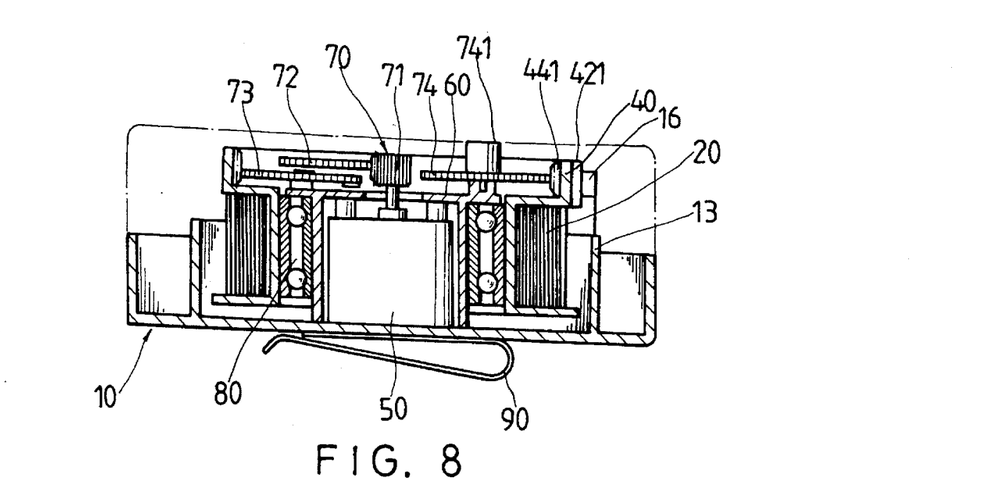
FIG. 8 is a sectional view of the present invention.

With reference to the drawings and in particular to FIGS. 5–8 thereof, the power-driven tape measure according to the present invention comprises a case 10 on which are mounted a clip 90 and a switch 30. The case 10 is formed with a chamber 12 for receiving batteries (not shown) and an outlet 108 for the passage of a tape 20. An annular reel 40 is rotatably arranged within the case 10. As shown in FIGS. 7 and 8, a motor 50 is fixedly mounted in the casing 10 and enclosed with a frame 60. The frame 60 has a center hole for the passage of the output shaft of the motor 50. A bearing 80 is sleeved over the frame 60.

Figure 9:
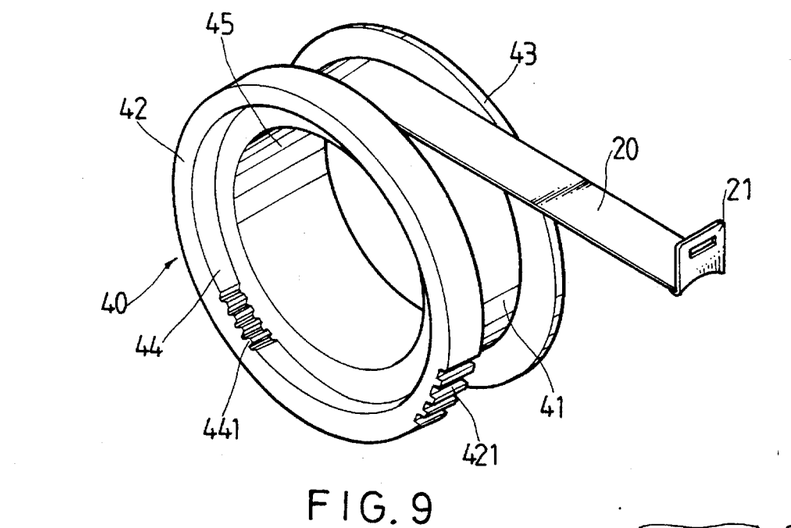
FIG. 9 is a perspective view of the reel.

Looking now at FIG. 9, the annular reel 40 is formed with a central space 45, a circular groove 41, and two flanges 42 and 43 at two sides. A tape 20 is completely received in the groove 41 of the annular reel 40. The first flange 42 is wider than the second flange 43 and has a plurality of internal teeth 441 on its inner surface and a plurality of external teeth 421 on its outer surface. The annular reel 40 is fixedly mounted on the bearing 80 so that the annular reel 40 will be rotated with the bearing 80.

Referring to FIGS. 7 and 8, a gear train 70 is disposed in the central space 45 of the annular reel 40 and includes a driving gear 71 fixedly mounted on the output shaft of the motor 50, a stepped gear 72 having a large gear and a small gear, and a driven gear 73. The large gear of the stepped gear 72 is pivotally mounted by a pin 17 and engaged with the driving gear 71, while the small gear of the stepped gear 72 with the driven gear 73. Further, the driven gear 73 is engaged with the internal teeth 441 of the first flange 42. Hence, the motor 50 can drive the annular reel 40 to rotate via the driving gear 71, the stepped gear 72, and the driven gear 73.

A manual gear 74 is pivotally mounted on the frame 60 and meshed with the internal teeth 441 of the annular reel 40.

Further, the manual gear 74 is provided at the center with a rod extending out of the case 10 and formed with a slot 741.

The annual reel 40 is enclosed with a circular portion 13 which is formed at the center of the case 10 so as to prevent the tape 20 from loosening. A roller 11 is provided near the outlet 108 of the casing 1 for supporting the tape 20.

The switch 30 has a leg 301 pivotally connected with an end of a pull rod 14. The other end of the pull rod 14 is pivotally connected with a press member 15 having a toothed stopper 16. The press member 15 is pushed by a spring 18 so that the toothed stopper 16 is normally pushed against the external teeth 421 of the annular reel 40. Hence, only when the switch 30 is pushed to remove the press member 15 away from the annular reel 40 will the tape 2 be pushed out of or pulled into the case 10.

The tape 20 has an outer end provided with a hook 21 which has a curved bottom for slightly curving the tape 20 so as to increase its strength when released from the case 10. This technique is well known in the art and is not considered a part of the present invention.

Figure 10A:
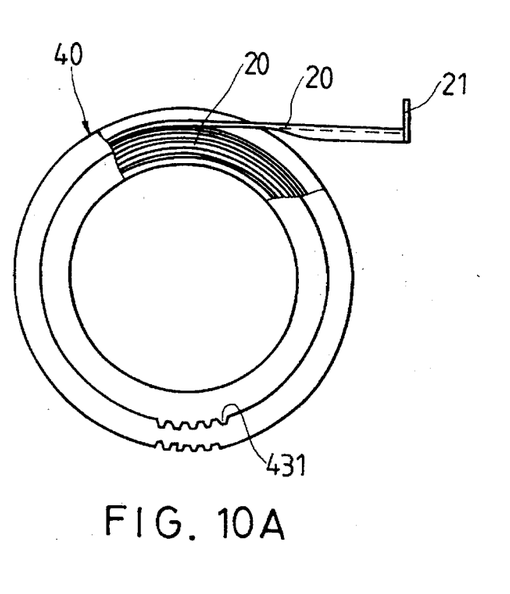
FIG. 10A shows the engagement between the tape and the annular reel.
Figure 10B:
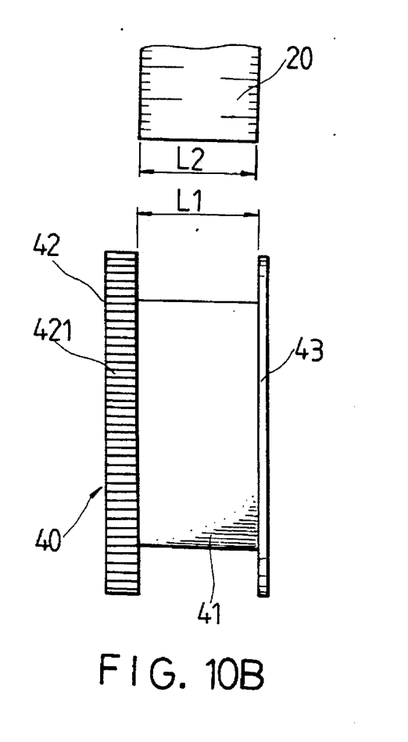
FIG. 10B shows a second characteristic of the present invention.

Another characteristic of the present invention is illustrated in FIGS. 10A and 10B. As shown, the groove 41 of the annular reel 40 has a width L1 which is slightly smaller than the width L2 of the tape 20 so that when the tape 20 is wound on the annular reel 20, the tape 20 will be kept within the groove 41 of the reel 40 thereby preventing the tape 20 from loosening without external force.

The invention is naturally not limited in any sense to the particular features specified in the foregoing or to the details of the particular embodiment which has been chosen in order to illustrate the invention. Consideration can be given to all kinds of variants of the particular embodiment which has been described by way of example and of its constituent elements without thereby departing from the scope of the invention. This invention accordingly includes all the means constituting technical equivalents of the means described as well as their combinations.

I claim:

1. A power-driven tape measure comprising:

a case having a battery chamber, a circular chamber, and an outlet communicated with the circular chamber;

a clip mounted on said case;

a switch mounted on said case;

a motor mounted within said case and having an output shaft;

a frame enclosing said motor;

an annular reel fitted with the circular chamber of said case and enclosing said frame, said annular reel having two flanges and a circular groove between the two flanges, one of said flanges being provided with external teeth on an outer surface thereof and internal teeth on an inner surface thereof;

a switch mounted on said case and electrically connected with the battery chamber of said case for controlling said motor, said switch having a leg pivotally connected with an end of a pull rod, another end of said pull rod being connected with a press member having a toothed stopper, said press member being pushed by a spring so that said toothed stopper is normally pushed against the external teeth of said annular reel;

a tape wound on the groove of said annular reel and having an end extending out of the outlet of said case to engage with a hook, said tape being slightly larger than the groove of said reel in width so that when the tape is wound on said annular reel, the tape will be kept within the groove of said annular reel thereby preventing the tape from loosening without external force;

a driving gear fixedly mounted on the output shaft of said motor and engaged with the internal teeth of said reel via a gear train; and a manual gear pivotally mounted on said frame and meshed with the internal teeth of said reel and provided at a center thereof with a rod extending out of said case.

* * * * *